United States Patent [19]

Kerrigan et al.

[11] Patent Number: 6,134,107
[45] Date of Patent: Oct. 17, 2000

[54] REVERSE CONVECTIVE AIRFLOW COOLING OF COMPUTER ENCLOSURE

[75] Inventors: Brian Michael Kerrigan; M. Lawrence Buller, both of Austin; Jeffrey William Young, Round Rock, all of Tex.

[73] Assignee: International Business Machines Corporation, Armonk, N.Y.

[21] Appl. No.: 09/174,613

[22] Filed: Oct. 19, 1998

[51] Int. Cl.[7] .............................. H05K 5/00; H05K 7/20; A47B 81/00; F28F 7/00
[52] U.S. Cl. ..................... 361/694; 361/695; 361/683; 361/688; 361/687; 312/223.2; 165/80.2
[58] Field of Search ..................................... 361/687, 688, 361/683, 694, 695; 312/223.2; 165/80.2

[56] References Cited

U.S. PATENT DOCUMENTS

| 5,000,079 | 3/1991 | Mardis ............................................. 98/1 |
| 5,748,442 | 5/1998 | Toor .......................................... 361/685 |
| 5,963,424 | 10/1999 | Hileman et al. ........................ 361/695 |

*Primary Examiner*—Leo P. Picard
*Assistant Examiner*—Tung Minh Bui
*Attorney, Agent, or Firm*—Casimer K. Salys; Felsman, Bradley, Vaden, Gunter & Dillon, LLP

[57] ABSTRACT

A computer has an internal chassis with a variety of electronic components including a power supply and a ventilation fan. The chassis is mounted within an enclosure which has having a ventilation port for exhaust air near a lower end. The power supply and ventilation fan are located at the bottom of the enclosure to lower the center of gravity of the computer and increase its overall stability while maintaining proper cooling efficiencies.

14 Claims, 3 Drawing Sheets

REVERSE CONVECTIVE AIRFLOW COOLING OF COMPUTER ENCLOSURE

TECHNICAL FIELD

This invention relates in general to electronic computers and in particular to ventilating the enclosure of an electronic computer.

BACKGROUND ART

Electronic computers house a variety of electronic components such as printed circuit boards, a power supply, connectors, a ventilation fan and the like. Each of these components is mounted to a chassis which is located inside an external housing or enclosure. The enclosure protects the exposed components from physical contact and shields the components from electromagnetic interference.

The components and, in particular, the power supply, generate a significant amount of heat during operation. The convective nature of heated air in the enclosure causes the heat to rise toward the upper end of the enclosure. Prior art computer towers have incorporated this natural convection into their systems by locating the power supply and ventilation fan at the top of the enclosure to increase the cooling efficiency of the system. These computers typically draw in air at room temperature through the ends or sidewalls of the enclosure and expel warm air from the top, an opposite end or sidewall. In addition, the ventilation fan is mounted directly adjacent to the exhaust port so as to enhance airflow.

These designs have several disadvantages. The power supply is relatively heavy and usually represents a substantial portion of the overall weight of the computer. Locating the power supply and other components near the top raises the center of gravity of the computer and reduces its stability. It also requires the computer to have a geometrically larger support base which uses up more desk or floor space. Moreover, controls such as the power on/off switch and the voltage selector switch are typically located near the top of the enclosure for greater accessibility. Even routine operation of these switches can increase the potential to tip over the computer. Finally, if the power supply cord is inadvertently pulled, the enclosure can also be tipped over, especially if the power cord enters the computer near the top of the enclosure. Although these designs are workable, an improved architecture for computers is desirable.

DISCLOSURE OF THE INVENTION

A computer has an internal chassis with a variety of electronic components including a power supply and a ventilation fan. The chassis is mounted within an enclosure which has having a ventilation port for exhaust air near a lower end. The power supply and ventilation fan are located at the bottom of the enclosure to lower the center of gravity of the computer and increase its overall stability while maintaining proper cooling efficiencies.

BEST MODE FOR CARRYING OUT THE INVENTION

Figure 1:
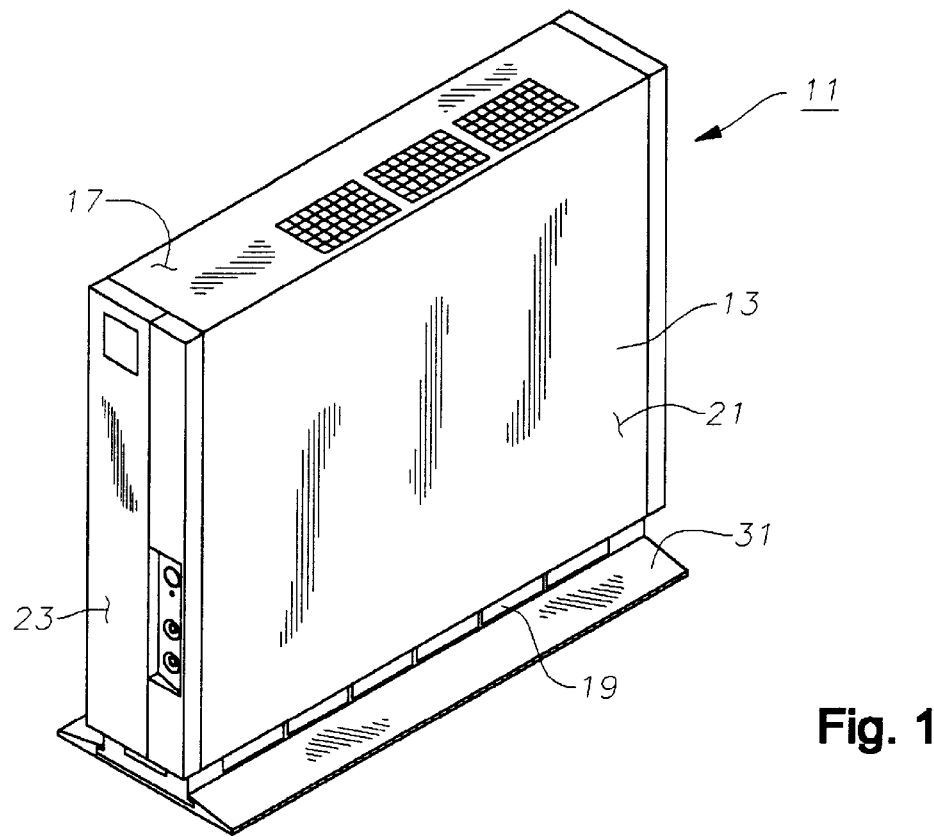
FIG. 1 is a front isometric view of a computer constructed in accordance with the invention.
Figure 2:
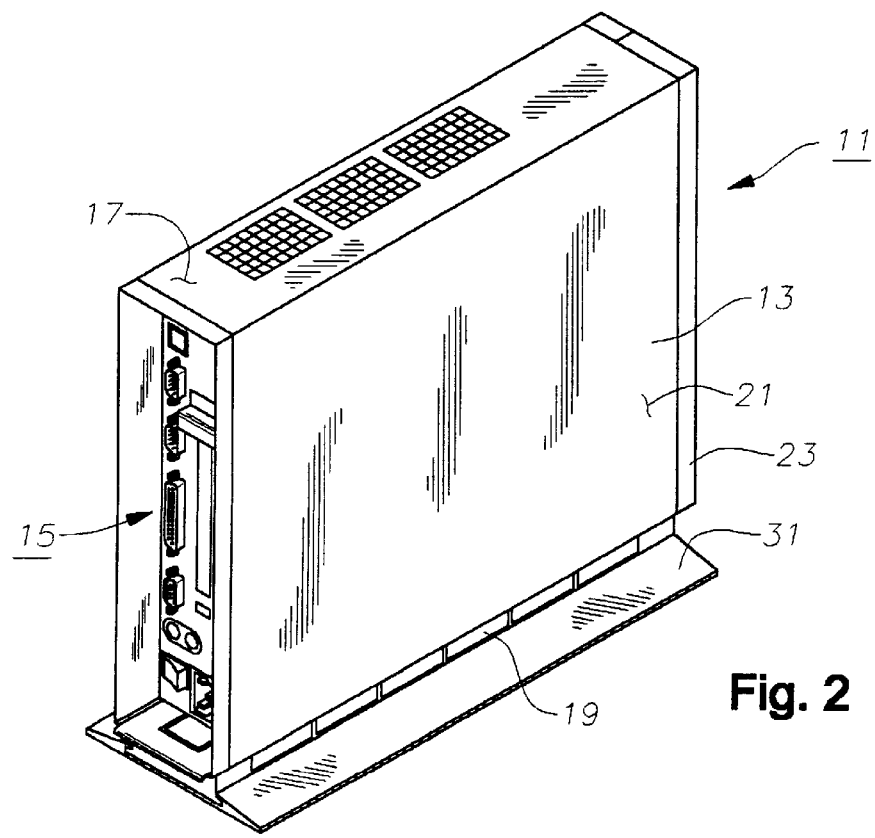
FIG. 2 is a rear isometric view of the computer of FIG. 1.

Referring to FIGS. 1 and 2, a network computer 11 is shown. In this disclosure, the term "tower" is used in reference to a computer which has a vertical dimension which is significantly greater than its horizontal width, such that the computer has a tall rectangular profile when viewed from either end. Computer 11 has an external metal housing or enclosure 13 and an internal metal frame or chassis 15. Enclosure 13 is essentially a five-sided rectangular box with an opening on a rearward end. Enclosure 13 has a top panel 17, a bottom panel 19, and two side panels 21, all of which are formed from a single sheet of metal which is bent to form four corners. A front panel 23 is integrally joined to the forward end of enclosure 13. A base or pedestal 31 is mounted to the lower surface of bottom panel 19. Base 31 is only slightly larger than the area of bottom panel 19 and is significantly smaller than prior art designs.

Figure 3:
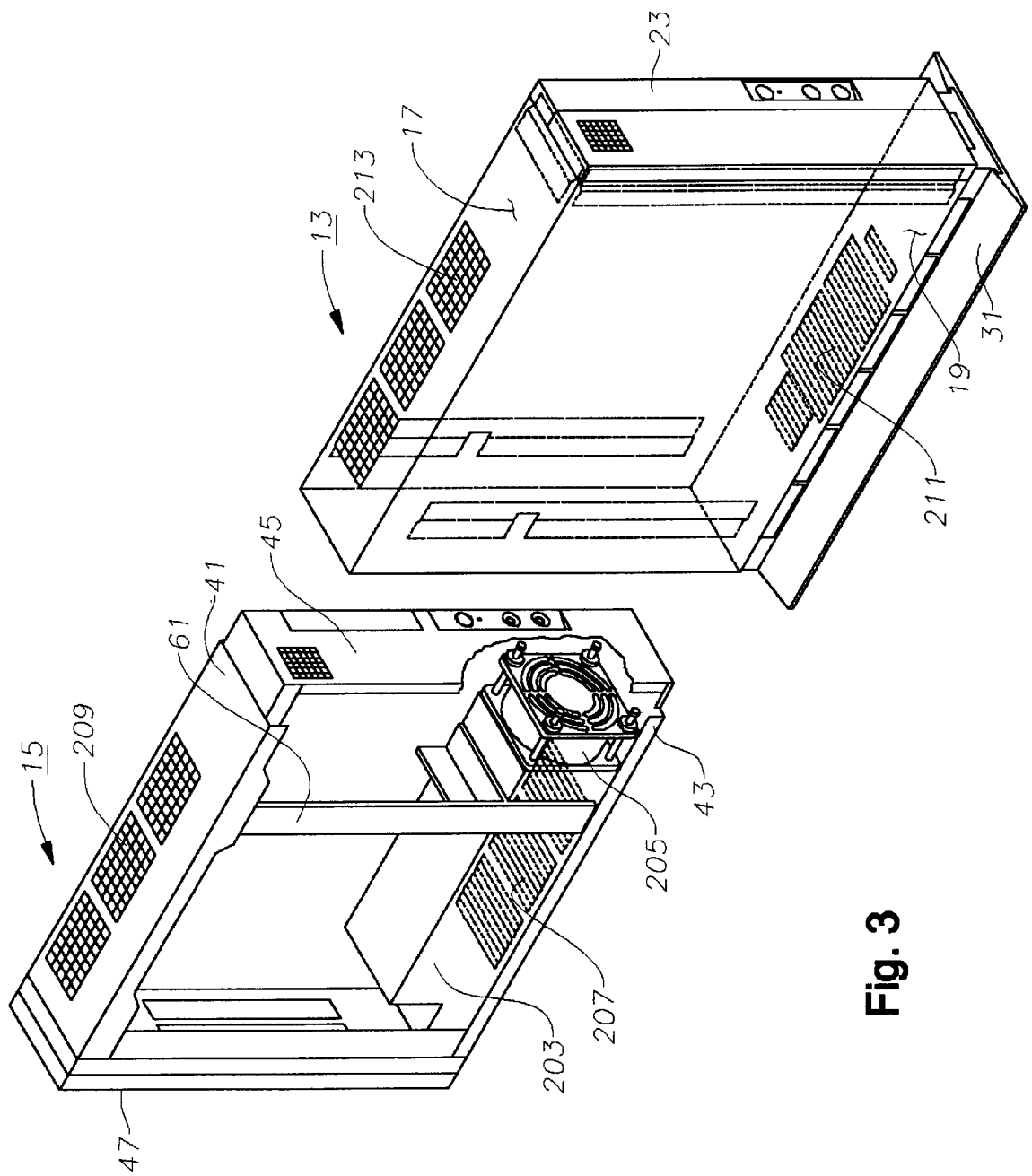
FIG. 3 is a front isometric, partially transparent view of the computer of FIG. 1 shown with its chassis removed from its enclosure and with its electronic components removed.

As shown in FIG. 3, chassis 15 is slidably mounted within enclosure 13. Chassis 15 has a rectangular perimeter of four wall-like frame members including a top 41, a 5 bottom 43 and front and rear ends 45, 47. This configuration allows the vertical sides of chassis 15 to remain open and uncovered. A strut 61 is mounted to and extends vertically between top 41 and bottom 43.

Figure 4:
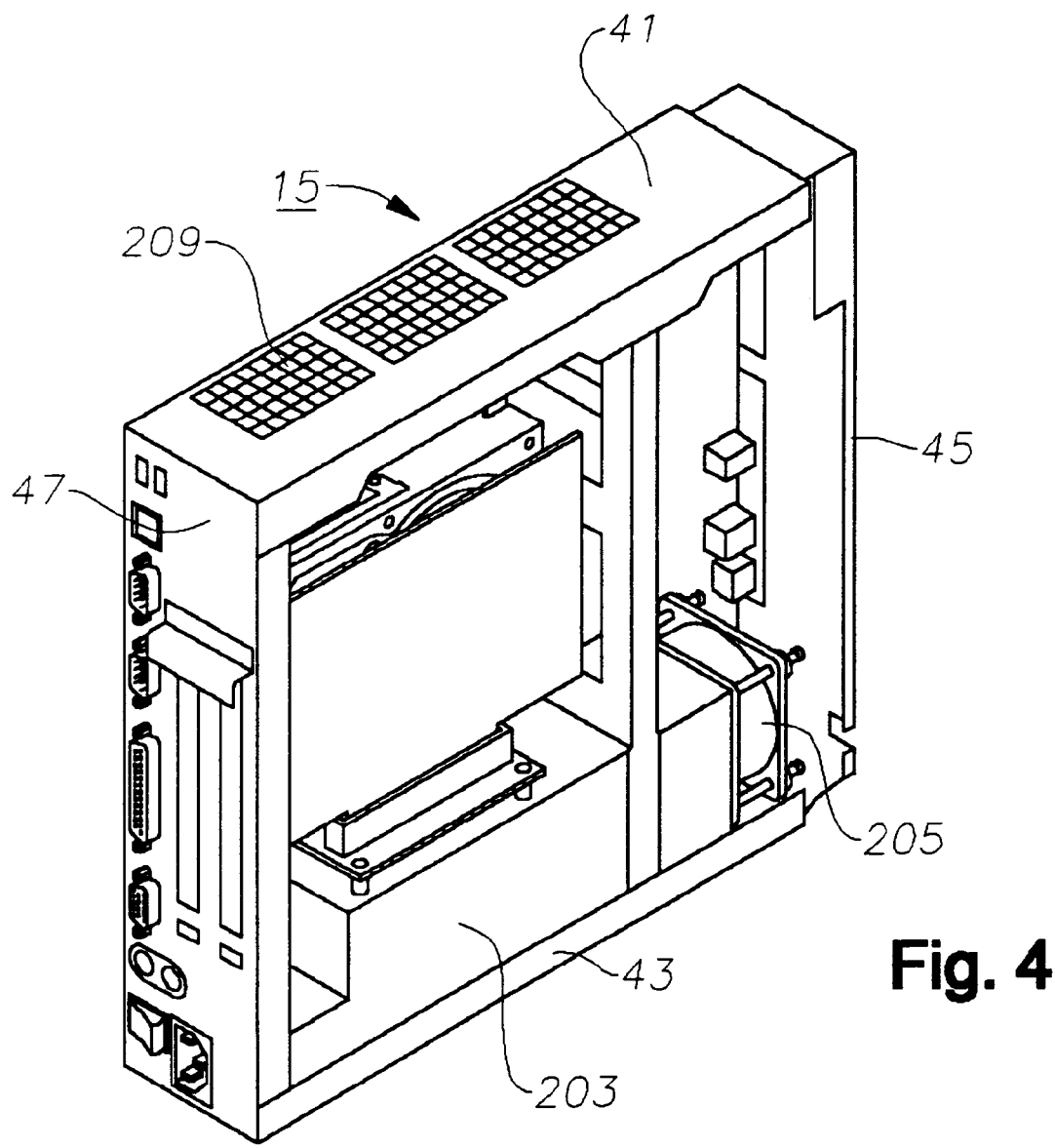
FIG. 4 is a rear isometric view of the chassis of FIG. 3 shown with its electronic components.

Referring now to FIGS. 3 and 4, chassis 15 also has a power supply 201 mounted to bottom 43. Power supply 201 has a square tubular sheet metal housing 203 with an 10=opening on its forward end. In some embodiments, housing 203 may be considered part of chassis 15. A ventilation fan 205 is mounted to the opening and is located within a perimeter of chassis 15 and is spaced apart from a rearward side of front end 45 and the other sidewalls of chassis 15 and enclosure 13. Housing 203 is open on its lower side for communication with an air exhaust port 207 in bottom 43. An air intake port 209 is 15 located at the upper end of chassis 15 in top 41. Ports 207, 209 have counterpart ports 211, 213, respectively, in enclosure 13. When chassis 15 is mounted in enclosure 13 (FIG. 4), port 207 aligns with port 211 and port 209 aligns with port 213.

In operation, enclosure 13 closely receives chassis 15 such that top panel 17 and bottom panel 19 slidably abut top 41 and bottom 43. In addition, the vertical side edge 20 portions of top 41 and bottom 43 slidably engage side panels 21 to eliminate excessive movement between chassis 15 and enclosure 13. When ventilation fan 205 is on, ambient air will be drawn into computer 11 through air intake ports 213, 209. This air is circulated downward through the interior of computer 11 which is warmed by heat generated by the electrical components. The circulating air cools the electrical components and maintains them at a proper operating temperature. Ventilation fan 205 then draws the warmed air out of computer 11 and forces it into housing 203 past the power supply 201 which is also cooled by the air circulation. The heated air is forced out of housing 203 and through exhaust ports 207, 211 where it is vented back into the ambient air.

The invention has significant advantages. Locating the power supply at the bottom of the computer lowers the center of gravity of the computer and increases its stability. This design allows the computer to have a geometrically smaller support base which uses less desk or floor space. Thermal modeling of the subject computer and prior art designs confirmed that the invention increases component temperatures by only 1 degree C.

While the invention has been shown or described in only some of its forms, it should be apparent to those skilled in the art that it is not so limited, but is susceptible to various changes without departing from the scope of the invention.

I claim:

1. A computer tower, comprising:
   an internal chassis having an upper end, a lower end, a plurality of electronic components mounted thereto, and a vertical dimension that is greater than a horizontal width wherein the vertical dimension extends from the lower end to the upper end;
   a computer tower enclosure surrounding the chassis, the enclosure having an air intake port at an upper end and an air exhaust port;
   means for supporting the lower end of the chassis wherein the supporting means is located at the lower end of the chassis; and
   a ventilation fan mounted to the chassis and positioned for directing a flow of air from the air intake port down to the air exhaust port and out of the computer tower.

2. The computer tower of claim 1 wherein the ventilation fan is mounted adjacent to the lower end of the chassis.

3. The computer tower of claim 1 wherein the air intake port is located in a top panel of the enclosure and the air exhaust port is located in a bottom panel of the enclosure.

4. The computer tower of claim 1, further comprising a housing mounted to the lower end of the chassis and having an opening on a lower surface for communication with the air exhaust port for cooling the electronic components throughout the entire enclosure, and wherein the ventilation fan is mounted in a port in the housing for circulating air into the housing.

5. The computer tower of claim 1, further comprising a power supply mounted to the lower end of the chassis adjacent to the lower end of the enclosure.

6. A computer tower, comprising:
   an internal chassis having an upper end, a lower end, and a plurality of electronic components mounted thereto;
   a computer tower enclosure surrounding the chassis, the enclosure having an air intake port at an upper end and an air exhaust port at a lower end; and
   a ventilation fan mounted to the chassis and positioned for directing a flow of air from the air intake port down to the air exhaust port and out of the computer tower; and wherein
   the ventilation fan is located within a perimeter of the chassis and is spaced apart from sidewalls of the chassis and the enclosure.

7. A computer tower, comprising:
   a computer tower enclosure having an air intake port at an upper end and an air exhaust port at a lower end;
   an internal chassis mounted within the enclosure and having an air intake port which registers with the air intake port in the enclosure, an air exhaust port which registers with the air exhaust port in the enclosure, and a plurality of electronic components mounted thereto;
   a power supply mounted to a lower end of the chassis adjacent to the air exhaust ports;
   a housing mounted to the lower end of the chassis and surrounding the power supply; and
   a ventilation fan mounted to the housing for directing a flow of air from the air intake ports through the housing to the air exhaust ports and out of the computer tower for cooling the electronic components throughout the entire enclosure.

8. The computer tower of claim 7 wherein the air intake ports are located in top panels of the enclosure and the chassis, respectively, and the air exhaust ports are located in bottom panels of the enclosure and the chassis, respectively.

9. The computer tower of claim 7 wherein the housing has an opening on a lower surface for communication with the air exhaust ports.

10. The computer tower of claim 7 wherein the ventilation fan is located within a perimeter of the chassis and is spaced apart from sidewalls of the chassis and the enclosure.

11. A computer tower, comprising:
    an internal chassis having an upper end, a lower end, and a plurality of electronic components mounted thereto;
    a computer tower enclosure surrounding the chassis, the enclosure having an air intake port at an upper end and an air exhaust port at a lower end:
    a housing mounted to the lower end of the chassis and having a vent port on one end and an opening on a lower surface for communication with the air exhaust port;
    a power supply mounted in the housing adjacent to the lower end of the enclosure for lowering the center of gravity of the computer tower;
    a ventilation fan mounted in the vent port of the housing for directing the flow of air from the air intake port through the housing and the air exhaust port and out of the computer tower; and wherein
    the ventilation fan is located within a perimeter of the chassis and is spaced apart from sidewalls of the chassis and the enclosure.

12. The computer tower of claim 11 wherein the air intake port is located in a top panel of the enclosure and the air exhaust port is located in a bottom panel of the enclosure.

13. A method of ventilating a computer, comprising:
    (a) providing a computer housing having a top panel, a bottom panel, sides therebetween, an air intake port in the top panel, and an exhaust port in the bottom panel;
    (b) drawing in cooling air through the air intake port; and then
    (c) exhausting air downward from the air intake port, throughout an interior of the housing and out through the exhaust port.

14. The method of claim 13 wherein step (c) further comprises directing air from the interior of the housing into a conduit containing a power supply adjacent to the bottom panel, and then out through the exhaust port.

* * * * *